(12) United States Patent (10) Patent No.: US 7,453,796 B2
Alicherry et al. (45) Date of Patent: Nov. 18, 2008

(54) METHOD AND APPARATUS FOR DESIGNING NETWORKS TO SUPPORT FAST RESTORATION

(75) Inventors: Mansoor Ali Khan Alicherry, Scotch Plains, NJ (US); Randeep Singh Bhatia, Somerset, NJ (US); Yung-Chun Wan, Greenbelt, MD (US)

(73) Assignee: Lucent Technologies Inc., Murray Hill, NJ (US)

( * ) Notice: Subject to any disclaimer, the term of this patent is extended or adjusted under 35 U.S.C. 154(b) by 704 days.

(21) Appl. No.: 10/860,948

(22) Filed: Jun. 4, 2004

(65) Prior Publication Data

US 2005/0286411 A1    Dec. 29, 2005

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. .................. 370/218; 370/228; 370/256
(58) Field of Classification Search ............ 370/216, 370/221, 222, 223, 224, 228, 256; 709/239
See application file for complete search history.

(56) References Cited

U.S. PATENT DOCUMENTS

| 5,734,640 A | * | 3/1998 | Johnson .................. 370/228 |
| 6,047,331 A | * | 4/2000 | Medard et al. ............ 709/239 |
| 7,133,359 B2 | * | 11/2006 | Weis ...................... 370/222 |

OTHER PUBLICATIONS

J.B. Kruskal, Jr., "On the Shortest Spanning Subtree of a Graph and the Traveling Salesman Problem," Proceedings of the American Mathematical Society, vol. 7, pp. 48-50, 1956.
M. Alicherry et al., "Pre-Provisioning Networks to Support Fast Restoration with Minimum Over-Build," IEEE Infocom, 11 pages, Mar. 2004.
D. Bienstock et al., "Strong Inequalities for Capacitated Survivable Network Design Problems," pp. 1-18, Dec. 1997.
C. Chekuri et al., "Building Edge-Failure Resilient Networks," Integer Programming and Combinatorial Optimization (IPCO), 18 pages, 2002.

(Continued)

*Primary Examiner*—Seema S. Rao
*Assistant Examiner*—Leon Andrews

(57) ABSTRACT

Improved network design techniques are provided. More particularly, the invention provides network design techniques that support fast restoration. In one aspect of the invention, a technique for designing a protection capacity to be reserved in a network comprises the following steps/operations. Link capacities associated with a network topology and existing working traffic in the network are obtained. Capacity partitions are determined for links in the network topology. Each of at least a portion of the capacity partitions comprise a protection capacity portion and a working capacity portion that equals or exceeds the existing working traffic on a corresponding link, such that upon a failure on the link, the working traffic on the link is rerouted over a pre-provisioned detour path using the protection capacity portion on one or more links on the detour path. Further, the capacity partition determination step/operation substantially guarantees protection for existing working traffic in the network. Still further, the capacity partition determining step/operation may further substantially guarantee protection for future working traffic in the network.

19 Claims, 4 Drawing Sheets

OTHER PUBLICATIONS

H. Choi et al., "On Double-Link Failure Recovery in WDM Optical Networks," Proc. Infocom, 9 pages, 2002.

G. Ellinas et al., "Automatic Protection Switching for Link Failures in Optical Networks with B-Directional Links," IEEE Proc. Globecom, pp. 152-156, 1996.

W.D. Grover, "Case Studies of Survivable Ring, Mesh and Mesh-Arc Hybrid Networks," Proc. Globecom, pp. 633-638, 1992.

W.D. Grover et al., "Cycle-Oriented Distributed Reconfiguration: Ring-Like Speed with Mesh-Like Capacity for Self-Planning Network Restoration," IEEE, pp. 537-543, 1998.

F. Jaeger, "A Survey of the Cycle Double Cover Conjecture," Annals of Discrete Mathematics, vol. 27, pp. 1-12, 1985.

M.S. Kodialam et al., "Dynamic Routing of Bandwidth Guaranteed Tunnels with Restoration," Proc. Globecom, 10 pages, 2000.

M.S. Kodialam et al., "Dynamic Routing of Locally Restorable Bandwidth Guaranteed Tunnels Using Aggregated Link Usage Information," IEEE Infocom, pp. 376-385, 2001.

M. Medard, "WDM Loop-Back Recovery in Mesh Networks," IEEE Infocom, vol. 2, pp. 752-759, Mar. 1999.

M. Medard et al., "Generalized Loop-Back Recovery in Optical Mesh Networks," IEEE, vol. 10, Issue 1, pp. 1-42, Feb. 2002.

J. Shi et al., "Hierarchical Self-Healing Rings," IEEE/ACM Transactions on Networking, vol. 3, No. 6, pp. 690-697, Dec. 1995.

C. Thomassen, "On the Complexity of Finding a Minimum Cycle Cover of a Graph," SIAM Journal of Computing, vol. 26, No. 3, pp. 675-677, Jun. 1997.

* cited by examiner

FIG. 1

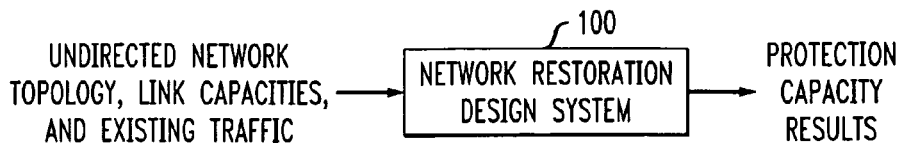

FIG. 2A

```
Let {e_1, e_2,...,e_m} be the links sorted in decreasing order of maximum available
protection capacities (u_e - W_e).
T_A = φ
for i = 1,...,m {
    if(T_A ∪ {e_i} does not form a cycle) {
        T_A = T_A ∪ {e_i}
        if(W_{e_i} > u_{e_i}/2)
            No solution exists.
        w^A_{e_i} = W_{e_i}
        p^A_{e_i} = u_{e_i} - W_{e_i}
        Mark e_i as unprotected
    } else {
        Let P = {e_{j_1}, e_{j_2},...e_{j_k}} be the unique path in T_A connecting the end-points
        of e_i.
        Let M be the links in P which are marked as unprotected.
        w = max_{e∈M} W_e  (w = 0 if M = ∅)
        p = min_{e∈P} p^A_e
        if (p < W_{e_i})
            No solution exists.
        w^A_{e_i} = max(W_{e_i}, min(p, u_{e_i} - w))
        p^A_{e_i} = u_{e_i} - W_{e_i}
        if (w > p^A_{e_i})
            No solution exists.
        Unmark edges in M.
    }
}
if any link e_i is marked
    No solution exists.
```

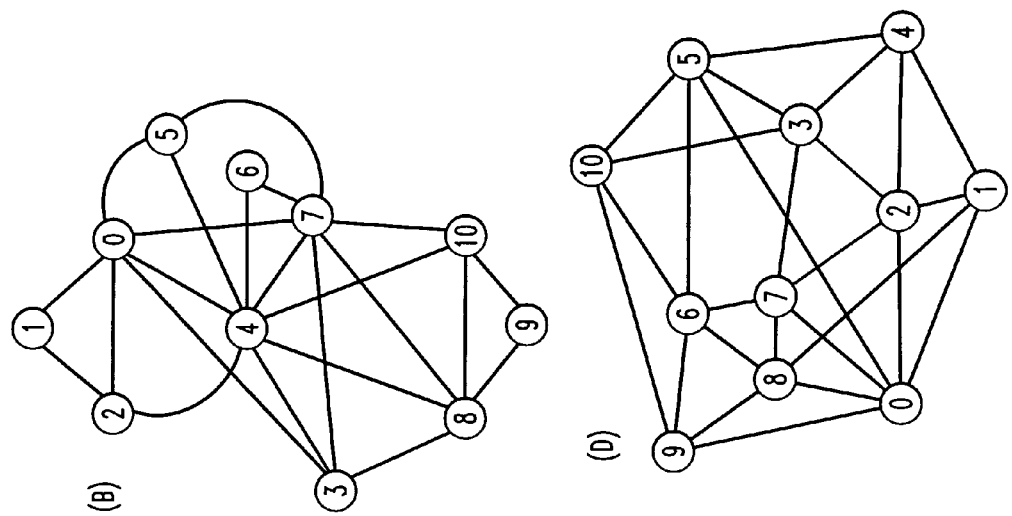
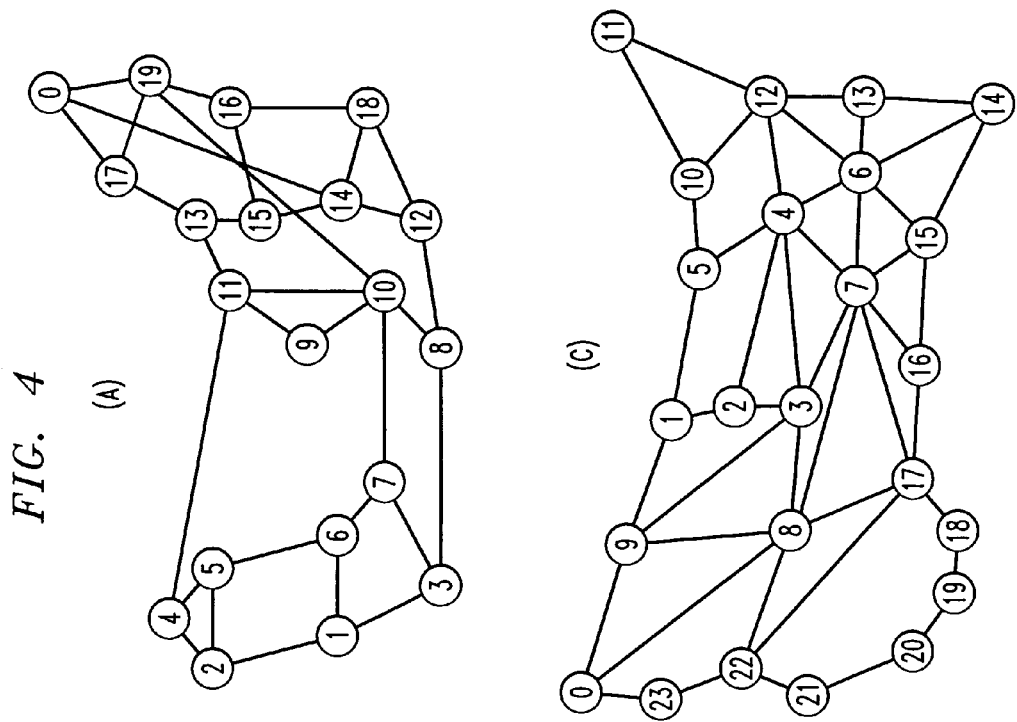
FIG. 4

(A)

| 50% MAX LOAD | | | UNIFORM | | | | NON-UNIFORM | | | |
|---|---|---|---|---|---|---|---|---|---|---|
| NETWORK | # NODE | # LINK | SUCCESS | TREE | TRIM | LP | SUCCESS | TREE | TRIM | LP |
| ARPANET | 20 | 32 | 100% | 1920 | 1810 | 1000 | 70% | 2810 | 2630 | 1715 |
| NJ LATA | 11 | 23 | 100% | 1090 | 1060 | 600 | 90% | 1520 | 1460 | 940 |
| NATIONAL | 24 | 44 | 100% | 2380 | 2250 | 1200 | 80% | 3660 | 3390 | 2075 |
| COST 239 | 11 | 26 | 100% | 1140 | 1120 | 550 | 100% | 1630 | 1590 | 930 |

(B)

| 60% MAX LOAD | | | UNIFORM | | | | NON-UNIFORM | | | |
|---|---|---|---|---|---|---|---|---|---|---|
| NETWORK | # NODE | # LINK | SUCCESS | TREE | TRIM | LP | SUCCESS | TREE | TRIM | LP |
| ARPANET | 20 | 32 | 70% | 1940 | 1800 | 1000 | 0% | - | - | 1715 |
| NJ LATA | 11 | 23 | 80% | 1100 | 1070 | 605 | 90% | 1530 | 1470 | 945 |
| NATIONAL | 24 | 44 | 50% | 2470 | 2290 | 1202 | 0% | - | - | 2091 |
| COST 239 | 11 | 26 | 70% | 1190 | 1170 | 550 | 60% | 1670 | 1590 | 930 |

METHOD AND APPARATUS FOR DESIGNING NETWORKS TO SUPPORT FAST RESTORATION

FIELD OF THE INVENTION

The present invention relates to network design techniques and, more particularly, to network design techniques that support fast restoration.

BACKGROUND OF THE INVENTION

Dynamic provisioning of bandwidth guaranteed paths with fast restoration capability is an important network service feature for the emerging Multi-Protocol Label Switched (MPLS) networks and optical mesh networks. The fast restoration capabilities are required in order to provide the needed reliability for services such as packetized voice, critical virtual private network (VPN) traffic, etc. Traditionally ring-based synchronous optical networks (SONETs) have offered 50 millisecond (ms) restoration to bandwidth guaranteed services, using pre-reserved spare protection capacity and pre-planned protection paths. Pre-planning protection in rings has been especially attractive, because of the availability of exactly one backup path between any two nodes, leading to very simple and fast automatic protection switching mechanisms. However, in ring-based SONET networks, these advantages come at the cost of reserving at least half the total capacity for protection.

A local restoration scheme has been proposed to provide fast restoration in mesh-based MPLS and optical networks. In this scheme, which is also referred to as link restoration, the traffic on each link e of the network is protected by a detour path that does not include link e. Upon failure of any link e, any traffic on e is switched to its detour path. Thus, link restoration provides a local mechanism to route around a failure. In this restoration scheme, the restoration capacity of the pre-setup detours is not used under normal no-failure conditions (except possibly by low priority preemptible traffic).

The main approaches for supporting a pre-provisioned link restoration scheme in mesh networks are based on identifying ring structures. Once the set of rings is identified, pre-planned restoration schemes (as in SONETs) are employed. In some of these approaches, the network is designed in terms of rings or by partially using rings. Thus, these schemes are only applicable to constrained topologies. In some other of these approaches, each link is covered by a cycle leading to a cycle cover for the network. Each of these cycles is then provisioned with enough protection capacity to cover the links that belong to it. On the failure of the link, the working traffic is rerouted over the protection capacities in the surviving links of the covering cycle. There are two drawbacks to these approaches: first, the amount of pre-provisioned protection capacity can be significant; and, second, it is hard to find the smallest cycle cover of a given network.

An improvement to these schemes is based on the notion of p-cycle. Here, the main idea is that a cycle can be used to protect not just the links on the cycle but also the chords (spokes) of the cycle, thus showing that far fewer cycles (than in a cycle cover) may be sufficient for providing full protection.

An alternative to cycle covers, intended to overcome the difficulty of finding good covers, is to cover every link in a network with exactly two cycles. A set of cycles that meets this requirement is called a double cycle cover. For planar graphs, double cycle covers can be found in polynomial-time. For non-planar graphs, it is conjectured that double cycle covers exist, and they are typically found quickly in practice. However, even for double cycle cover-based protection schemes, the required pre-provisioned protection capacity can be significant.

Non-ring based approaches to link restoration on mesh networks include generalized loop back, where the main idea is to select a digraph, called the primary, such that the conjugate digraph, called the secondary, can be used to carry the switched traffic for any link failure in the primary. Existing approaches have considered the problem of adding protection capacity to the links of a given network (primary) carrying working traffic, at minimum cost, so that the resulting network is capable of supporting link protection for a given set of links, where the protection is provided to the working traffic on the primary network. In such models, no limit is imposed on the total capacities of the links, and they provide a 4-approximation algorithm when all links in the original primary network have uniform bandwidth (carrying the same amount of working traffic) and they provide a 10.87-approximation algorithm for the general case. In addition, a O(log n)-approximation algorithm has been proposed for the problem of jointly designing the primary and protected networks, given a demand matrix for the working traffic.

All the schemes mentioned above assume that protection is provided for a single link failure. A heuristic has been proposed for protecting against two link failures, based on link restoration. While the problem of survivable network design has also been extensively studied, most of the work has focused on obtaining strong relaxations to be used in cutting plane methods.

However, improved network design techniques for supporting fast restoration are needed.

SUMMARY OF THE INVENTION

The present invention provides improved network design techniques. More particularly, the invention provides network design techniques that support fast restoration.

In one aspect of the invention, a technique for designing a protection capacity to be reserved in a network comprises the following steps/operations. Link capacities associated with a network topology and existing working traffic in the network are obtained. Capacity partitions are determined for links in the network topology. Each of at least a portion of the capacity partitions comprise a protection capacity portion and a working capacity portion that equals or exceeds the existing working traffic on a corresponding link, such that upon a failure on the link, the working traffic on the link is rerouted over a pre-provisioned detour path using the protection capacity portion on one or more links on the detour path. Further, the capacity partition determination step/operation substantially guarantees protection for existing working traffic in the network. Still further, the capacity partition determining step/operation may further substantially guarantee protection for future working traffic in the network.

The capacity partition determining step/operation may further comprise determining a feasibility of protecting the existing working traffic in the network. The capacity partition determining step/operation may further comprise substantially guaranteeing protection for the existing working traffic and future working traffic against a fixed number of network link failures using only pre-provisioned protection capacity and detour paths. Further, the capacity partition determining step/operation may further comprise substantially guaranteeing protection for existing and future working traffic in the network independent of the amount or nature of working traffic carried by the network. The capacity partition determining step/operation may further comprise substantially guaranteeing protection for existing and future working traffic in the network independent of routing for working traffic carried by the network.

In addition, the capacity partition determining step/operation may further comprise determining a capacity partition in accordance with a spanning tree based methodology that computes a maximum spanning tree based on a maximum protection capacity of a link. The capacity partition determining step/operation may further comprise setting the working capacity of a cross link to the minimum of the maximum protection capacity of the links, that are part of the maximum spanning tree, in a detour path associated with a given link to ensure that the one or more links, that are part of the maximum spanning tree, in the detour path have sufficient protection capacity to protect the given link upon failure. The capacity partition determining step/operation may further comprise boosting capacity in one or more cross links, that are not part of the maximum spanning tree, to ensure that one or more unprotected links, that are part of the maximum spanning tree, in the detour path associated with the given link are now protected.

Still further, the network topology may comprise an optical network topology, a multi-protocol label switching network topology, or an asynchronous transfer mode network topology.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a diagram illustrating a network restoration design system according to an embodiment of the present invention;

FIG. 2A is a diagram illustrating a network restoration design algorithm according to an embodiment of the present invention;

FIGS. 4A through 4D are diagrams illustrating four graphs for use in describing one or more embodiments of the present invention;

FIGS. 5A and 5B are diagrams illustrating tables for use in describing one or more embodiments of the present invention.

DETAILED DESCRIPTION OF PREFERRED EMBODIMENTS

Figure 2B:
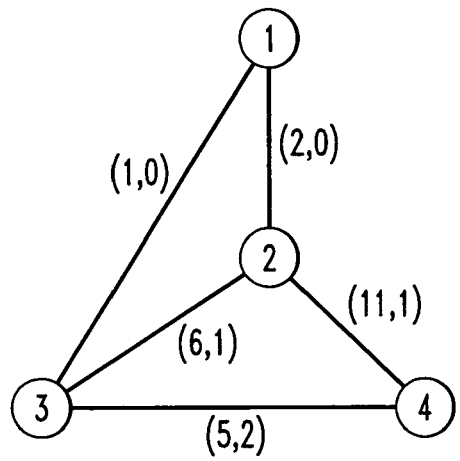
FIG. 2B is a diagram illustrating a network for use in describing an example of the algorithm of FIG. 2A, according to an embodiment of the present invention.

The following description will illustrate the invention in the context of an exemplary MPLS network. It should be understood, however, that the invention is not necessarily limited to use with any particular type of network. The invention is instead more generally applicable to any environment in which it is desirable to perform network design that supports fast restoration. Thus, by way of example only, the techniques of the invention may also be applied to optical networks and asynchronous transfer mode (ATM) networks.

As generally used herein, the phrases "detour path" or "bypass (or backup) tunnel" refer to a path in the network along whose links protection capacity is reserved to carry all or a portion of the rerouted working traffic, subsequent to a failure, of a given link of the network. The phrases are not intended to be limited to any particular type of network.

It is to be understood that an important consideration for a fast restoration scheme is to minimize the network resources dedicated for restoration and hence to maximize the proportion of network resources available for carrying traffic under normal working conditions.

The present invention addresses, inter alia, the optimization problem of dedicating the least amount of the currently available network capacity for protection, while guaranteeing fast restoration to the existing traffic along with any traffic that may be admitted in the future, for the pre-provisioned link restoration scheme. Specifically, we are interested in partitioning the available link capacities into working and protection, such that the latter is dedicated for restoration and the former is available to carry any current or new traffic, with the objective of guaranteeing link restoration for minimal total protection capacity. Note that in a network with a static topology, this problem may need to be solved only once, since the solution remains feasible even as the admitted traffic pattern changes. However, the solution may not stay optimal over time as the admitted traffic pattern changes, and may be recomputed occasionally to ensure efficient utilization of network resources. Also changes in network topology (which are common but not frequent) may require recomputing the solution, since the old solution may not even guarantee link restoration.

The remainder of the detailed description is organized as follows. Section I defines the illustrative problem and illustratively summarizes our results. In Section II and Section III, we present an efficient illustrative algorithm for the problem and illustratively analyze its performance. Section IV provides an illustrative implementation using a linear program-based approach. Section V illustrates that the given problem is NP-hard. In Section VI, illustrative simulation results are presented. Section VII describes an illustrative hardware implementation.

I. Problem Description and Results

Given an undirected network G=(V, E), with link capacities $u_e$ and existing traffic $W_e$ on link $e \in E$, the illustrative problem is to partition the capacities on link e into a working capacity $w_e$ and a protection capacity $p_e$ (s.t. $w_e + p_e = u_e$) such that:

The total protection capacity $\Sigma_{e \in E} p_e$ is minimized.

For every link e=(u, v), in the network G−e obtained by removing link e from G, there exists a path $P_e$ (detour for link e) between nodes u and v, such that every link e' on $P_e$ satisfies $p_{e'} \geq w_e$.

The working capacity $w_e$ is at least the amount of the existing traffic $W_e$.

In case such a partition is not feasible on G, output an empty solution.

In other words, on link e, $p_e$ capacity is reserved for carrying restored traffic during failures and at most $w_e$ ($>W_e$) traffic is carried during normal working conditions. Thus, on the failure of link e, at most $w_e$ traffic on it is rerouted over the pre-setup detour path $P_e$ using only the reserved capacities on the links on $P_e$.

Note that given the $p_e$ and $w_e$, values for all links e in any feasible solution, the detour paths $P_e$ can be easily computed.

Hence we do not include the computation of the detour paths $P_e$ in the statement of the problem.

We show that given an instance of the problem, it can be determined in polynomial time, using a fast and efficient algorithm, if the problem has a feasible solution. However, we show that computing an optimal solution for feasible instances is NP-hard. Moreover, we present a fast and efficient algorithm that computes a solution to the given feasible instance in which the total protection capacity reserved is guaranteed to be within two times the protection capacity reserved in any optimal solution (i.e., a "2-approximation" solution). We also show that the integrality gap of a natural relaxation of our illustrative problem is unbounded.

II. Illustrative Algorithm

Before describing the illustrative design algorithm (methodology), reference is made to FIG. 1. FIG. 1 is a block diagram illustrating a network restoration design system for computing protection capacity according to an embodiment of the present invention. In general, the design system 100 receives as input an undirected network topology with link capacities and existing traffic. The design methodology described herein is then employed to compute the protection capacity results (i.e., the protection capacity to be reserved).

Design system 100 may be a standalone computation system or it may be operatively connected to one or more components of a network for which it is computing results. Results computed by design system 100 may be implemented automatically and/or manually so as to realize an efficiently designed network.

Recall that $u_e$ is the total capacity of link e, and $W_e$ is the amount of existing traffic in link e. We define $u_e - W_e$ to be the maximum protection capacity available on the link e.

FIG. 2A illustrates a network restoration design algorithm 200 (methodology), according to an embodiment of the present invention. Algorithm 200 creates a solution by first computing a maximum spanning tree $T_A$ (using a maximum spanning tree algorithm) based on the maximum protection capacity available on the links. For this purpose, the present invention may use the well-known Kruskal's Maximum Spanning Tree algorithm, for example, as disclosed in J. B. Kruskal, "On the Shortest Spanning Tree of a Graph and the Traveling Salesman Problem," Proceedings of the American Mathematical Society, 7:48-56, 1956, the disclosure of which is incorporated by reference herein. Algorithm 200 sets the protection capacity of any link e on the maximum spanning tree $T_A$ to the maximum protection capacity available on link e. For any non-tree ($T_A$) link e (called cross link), algorithm 200 initially sets its working capacity equal to the minimum protection capacity assigned to the links on the unique path in $T_A$ between the end-points of link e.

Algorithm 200 then selects some number of the cross links and boosts up their protection capacities. Advantageously, the cross links are protected by using only links in the tree $T_A$. Also, for each tree link e, its detour comprises all but one tree link, and the boosting up of some cross links is used to ensure that the cross link on this detour has enough protection to protect e. The working and protection capacities assigned on link e are denoted by $w_e^A$ and $p_e^A$, respectively ($w_e^A + p_e^A = u_e$).

Referring now to FIG. 2B, a diagram illustrates a network for use in describing an example of the algorithm of FIG. 2A, according to an embodiment of the present invention. In the example network, there are 4 nodes (1, 2, 3, 4) and 5 edges. Each link is labeled with a tuple (u, W) where u is the total capacity of the link and W is the existing traffic on the link. For example, link (3, 4) is labeled with tuple (5, 2) implying that there are 2 units of existing traffic on this link of total capacity 5 units (thus there are 3 units of available protection capacity on the link). Algorithm 200, when applied to this example network, works as follows.

The link with the highest available protection capacity is link (2, 4) (with 10 units of available protection capacity). It is added to the tree and, since it is not a cross link, its protection capacity is set to 10 units (and its working capacity is set to 1 unit). Next, link (2, 3) is added and, since it is also not a cross link, its protection and working capacities are set to 5 and 1 units, respectively.

Next, link (3, 4) is added and is found to be a cross link. This link must be used to protect the links (2, 3) and (2, 4) (links on the unique path in the tree between nodes 3 and 4) of the tree. Its initial working capacity is set to the maximum possible value that can be protected by links (2, 3) and (2, 4). Since all 5 units can be protected by these links, its initial working capacity and, hence, the initial protection capacity, is set to 5 and 0 units, respectively. Note that with zero protection capacity, this link is not able to protect 1 unit of allowed working traffic on links (2, 3) and (2, 4). Hence, the protection capacity of link (3, 4) is boosted to 1 unit (and working capacity set to 4 units). Now, both links (2, 3) and (2, 4) are protected.

Next, link (1, 2) is added and is not a cross link and, hence, its protection capacity is set to 2 units (and its working capacity is set to 0 units).

Finally, link (1, 0) is added and is found to be a cross link. Its initial working capacity is set to 1 unit (and protection capacity to 0 units). The only unprotected link in the tree on the unique path between nodes 1 and 3 is link (2, 0) and its working capacity is 0 units, which does not require any protection. Hence, the protection capacity of link (1, 0) is not boosted anymore and stays at 0 units.

It is to be appreciated that the solution (if any) returned by algorithm 200 is a feasible solution. It is readily evident that the amount of working traffic of every link ($w_e^A$) in a solution returned by algorithm 200 is at least the amount of existing traffic ($W_e$). Now we show that, for every link e=(u, v), there is a backup path $P_e$ in G−e between nodes u and v, such that every link e' on $P_e$ satisfies $p_{e'}^A \geq w_e^A$.

Case 1, for all $e \in T_A$: Note that G−e is connected, because otherwise link e would stay marked at the end of the algorithm in which case no solution is returned by the algorithm. Thus, there is at least one cross link $e_c = (u_c, v_c)$, which, together with the unique path in $T_A$ between nodes $u_c$ and $v_c$, (excluding link e), forms a backup path for e. Without loss of generality, let $e_c$ be the first cross link considered by the algorithm, such that adding it to $T_A$ results in a cycle C containing link e. Consider the path $P_e = C \setminus \{e\}$. The link $e_c$ has been assigned the least protection by the algorithm among the links on $P_e$. Note that link e is marked (hence in M) at the time when $e_c$ is considered by the algorithm. Thus, when link $e_c$ is considered by the algorithm, we must have $p_{e_c}^A \geq w \geq W_e = w_e^A$ implying that $P_e$ is a valid backup (detour) for link e.

Case 2, for all $e \notin T_A$: The backup path $P_e$ for link e is the unique path in $T_A$ connecting e, which always exists. The links on this path have enough protection because the algorithm sets the working traffic $w_e^A$ of link e to at most $\min_{e' \in P_e} p_{e'}^A$.

Also, it is to be appreciated that, if a feasible solution exists, the algorithm will return a solution. The algorithm will not return a solution in 4 cases.

Case 1, there exists a link $e \in T_A$, $W_e > u_e/2$: If a tree link e has $W_e > u_e/2$, then no solution exists. This is because, the maximum protection capacity available on e ($u_e - W_e$) is strictly less than $u_e/2$. If there was a solution, then there must exist a path $P_e$ in G−e between the end points of e all whose links e' have maximum protection capacity available $u_e-W_e>u_e/2$. But then $T_A$ is not a maximum spanning tree based on the maximum protection capacity available on the links, a contradiction.

Case 2, there exists a link $e_c \notin T_A$, $p<W_e$: The proof for this case uses arguments similar to case 1.

Case 3, there exists a link $e_c \notin T_A$, $w>p_{e_c}^A$: Note that in this case $M \neq \emptyset$. Let $e_c=(u_c,v_c)$ and let $P_{e_c}$ be the unique path in $T_A$ connecting nodes $u_c$ and $v_c$. Let $e \in M$ be a marked link on the path $P_{e_c}$ with $w=W_e=w_e^A$, at the time when $e_c$ is considered by the algorithm. Let $P_e$ be a feasible detour for link e. Thus, the maximum protection capacity available on all links e' on $P_e$ is $u_e-W_e \geq w$. Also $P_e \cup \{e\}$ forms a cycle in G, thus at least one link on $P_e$ is a cross link for $T_A$, that forms a cycle containing link e when added to $T_A$. This link must have been considered before link $e_c$ since it has strictly more maximum protection capacity available on it. Hence, link e must already be marked before link $e_c$ is considered, a contradiction.

Case 4, there is an unmarked link $e=(u,v)$ at the end: In this case in G–e nodes u and v are not connected. Hence, no detour is possible for link e.

From the above two propositions, it can be proven that algorithm 200 is correct.

For each link e in $T_A$, its protection capacity can be lowered until lowering it further would require decreasing the working capacity of some other links, or would make the working capacity of link e so large that there is no feasible detour for it. This trimming may reduce the total protection capacity, however, it has no implication on our analysis of the worst-case approximation ratio for the algorithm.

III. Analysis

In this section, it is shown that algorithm 200 is a 2-approximation algorithm. First we define some notations. Let $p_e^{OPT}$ be the protection capacity of link e in an optimal solution OPT, and $w_e^{OPT}$ be the working capacity of link e in OPT, thus $w_e^{OPT}=u_e-p_e^{OPT}$. To compare the solution of algorithm 200 with OPT, we construct a maximum spanning tree $T_{OPT}$ based on the protection capacities $p_e^{OPT}$.

We partition the links in the network into 4 sets: $E_{AO}=\{e|e \in T_A, e \in T_{OPT}\}$, $E_{A\bar{O}}=\{e|e \in T_A, e \notin T_{OPT}\}$, $E_{\bar{A}O}=\{e|e \notin T_A, e \notin T_{OPT}\}$, and $E_{\bar{A}O}=\{e|e \notin T_A, e \in T_{OPT}\}$. We define $p_E^{OPT}$ to be $\Sigma_{e \in E}p_e^{OPT}$ (sum of protection capacities in OPT over all links in E), $p_E^A$ to be $\Sigma_{e \in E}p_e^A$ (sum of protection capacities in our solution over all links in E), and $u_E$ to be $\Sigma_{e \in E}u_e$. For a link $e \notin T_A$, we use $B_e^A$ to represent the unique path in $T_A$ connecting the end-points of e. Similarly for $e \notin T_{OPT}$, we use $B_e^{OPT}$ to represent the unique path in $T_{OPT}$ connecting the end-points of e. Since both $T_A$ and $T_{OPT}$ are spanning trees, both trees have the same number of edges. It is evident that $|E_{A\bar{O}}|=|E_{\bar{A}O}|$.

For a cross link e (not in $T_A$), we assume that the algorithm assigns a basic "Level-1" protection capacity of $p_e^{L1}=\max(0, u_e-\min_{e' \in B_e^A}p_{e'}^A)$ and a working capacity of $w_e^{L1}=\min(u_e, \min_{e' \in B_e^A}p_{e'}^A)$. The cross links e with $p_e^{L1}=p_e^A$ are non-boosted cross links. Note that the protection capacity of the other cross links e are boosted from $p_e^{L1}$ to $W_{e'}$, by the algorithm, where e' is the tree link with the largest existing traffic ($W_{e'}$), among all tree links protected by e (which are in M when link e is considered by the algorithm). Also note that there are at most n–2 such boosted cross links, each protecting a different link in $T_A$. It is evident that:

$$p_E^A \leq \Sigma_{e \in T_A}p_e^A + \Sigma_{e \notin T_A}p_e^{L1} + \Sigma_{e \in T_A}W_e.$$

The total protection capacity used by algorithm 200 is thus at most $p_{E_{AO}}^A + p_{E_{A\bar{O}}}^A + p_{E_{\bar{A}O}}^{L1} + p_{E_{\bar{A}\bar{O}}}^{L1} + W_{E_{AO}} + W_{E_{A\bar{O}}}$.

It is to be appreciated that, for all links $e_{A\bar{O}} \in E_{A\bar{O}}$, $$w_{e_{A\bar{O}}}^{OPT} \leq p_{e'}^{OPT},$$

for any $$e' \in B_{e_{A\bar{O}}}^{A_{OPT}}.$$

This may be proven as follows. For all links $e_{A\bar{O}} \in E_{A\bar{O}}$, (note that $e_{A\bar{O}}$ is a cross link for $T_{OPT}$)

$$w_{e_{A\bar{O}}}^{OPT} \leq \min_{e \in S} p_e^{OPT} \quad (1)$$

where S is the backup (detour) path for $e_{A\bar{O}}$ in OPT $$\leq \min_{e \in B_{e_{A\bar{O}}}^{OPT}} p_e^{OPT} \quad (2)$$

$$\leq p_{e'}^{OPT}, \text{ for any } e' \in B_{e_{A\bar{O}}}^{OPT} \quad (3)$$

The first inequality follows from the definition of S. The second inequality holds because $T_{OPT}$ is a maximum spanning tree of OPT based on the protection capacities $p_e^{OPT}$.

It is also to be appreciated that, for all links $e_{\bar{A}O} \in E_{\bar{A}O}$, $$p_{e_{\bar{A}O}}^{OPT} \leq \min_{e \in B_{e_{\bar{A}O}}^A} p_e^A.$$

This may be proven as follows. Note that $e_{\bar{A}O}$ is in the OPT tree $T_{OPT}$, but not included in $T_A$. Therefore, the maximum protection possible on $e_{\bar{A}O}$ in any solution is at most the minimum protection assigned by algorithm 200 to the links on the unique path in $T_A$ connecting the end-points of link $e_{\bar{A}O}$.

Further, it is to be appreciated that, for any links $e_{A\bar{O}} \in E_{A\bar{O}}$, and any links $e_{\bar{A}O} \in E_{\bar{A}O}$ where $e_{\bar{A}O}$ lies on the unique path in $T_{OPT}$ connecting the end-points of link $e_{A\bar{O}}$, we have $$p_{e_{\bar{A}O}}^{L1} \leq u_{e_{\bar{A}O}} - w_{e_{A\bar{O}}}^{OPT}.$$

This may be proven as follows:

$$p_{e_{\bar{A}O}}^{L1} = \max\left(0, u_{e_{\bar{A}O}} - \min_{e \in B_{e_{\bar{A}O}}^A} p_e^A\right) \quad (4)$$

$$\leq u_{e_{\bar{A}O}} - p_{e_{\bar{A}O}}^{OPT} \quad (5)$$

$$\leq u_{e_{\bar{A}O}} - w_{e_{A\bar{O}}}^{OPT} \quad (6)$$

The first equality follows from the definition of $p_{e_{\overline{A}O}}^{L1}$. The second inequality holds based on the rationale above and the fact that $$u_{e_{\overline{A}O}} \geq p_{e_{\overline{A}O}}^{OPT}.$$

The third inequality also holds based on the rationale above, with $e'=e_{\overline{A}O}$.

Still further, it is to be appreciated that, for any links $e_{A\overline{O}} \in E_{A\overline{O}}$, and any links $e_{\overline{A}O} \in E_{\overline{A}O}$ where $e_{\overline{A}O}$ lies on the unique path in $T_{OPT}$ connecting the end-points of link $e_{A\overline{O}}$, we have $$p_{E_{A\overline{O}}}^{A} + W_{e_{A\overline{O}}} + p_{e_{\overline{A}O}}^{LI} + p_{e_{A\overline{O}}}^{OPT} + 2 p_{e_{\overline{A}O}}^{OPT}.$$

This may be proven as follows:

$$p_{e_{A\overline{O}}}^{A} + W_{e_{A\overline{O}}} + p_{e_{\overline{A}O}}^{LI} \leq u_{e_{A\overline{O}}} + \left(u_{e_{\overline{A}O}} - w_{e_{A\overline{O}}}^{OPT}\right) \quad (7)$$

$$= p_{e_{A\overline{O}}}^{OPT} + u_{e_{\overline{A}O}} \quad (8)$$

$$\leq p_{e_{A\overline{O}}}^{OPT} + 2 p_{e_{\overline{A}O}}^{OPT} \quad (9)$$

The first inequality follows based on the rationale above. The second equality follows from the definitions of protection and working traffic. The third inequality follows from the fact that $p_e^{OPT}$ must be at least $u_e/2$ for any link $e \in T_{OPT}$. The proof is along the same lines as the proof of Case 1 above.

It is to be appreciated that $$p_{E_{A\overline{O}}}^{A} + W_{E_{A\overline{O}}} + p_{E_{A\overline{O}}}^{LI} \leq p_{E_{A\overline{O}}}^{OPT} + 2 p_{E_{\overline{A}O}}^{OPT}.$$

This may be proven as follows. For each link $e_{A\overline{O}} \in E_{A\overline{O}}$, we will show how to pair it up with a unique link $e_{\overline{A}O} \in E_{\overline{A}O}$, where $e_{\overline{A}O}$ lies on the unique path in $T_{OPT}$ connecting the end-points of link $e_{A\overline{O}}$. Summing the immediately preceding proposition over all such pairs, proof of this proposition follows.

Consider a bipartite graph $(E_{A\overline{O}} \cup E_{\overline{A}O}, E_m)$, where $E_m$ contains edge $(e_{A\overline{O}}, e_{\overline{A}O})$ if $e_{\overline{A}O}$ lies on the unique path in $T_{OPT}$ connecting the end-points of link $e_{A\overline{O}}$. A one to one pairing of edges in $E_{A\overline{O}}$ with edges in $E_{\overline{A}O}$ can be done by finding a perfect matching on the bipartite graph. We now show a perfect matching must exist, using Hall's Theorem (D.B. West, Introduction to Graph Theory, $2^{nd}$ ed., Prentice Hall, 2001). Given any subset $S$ of $E_{A\overline{O}}$, find a forest $F$ which is the union of all the unique paths in $T_{OPT}$ connecting the end-points of links in $E_{A\overline{O}}$. Note that all links in F are in $T_{OPT}$. It is evident that at least $|S|$ links in F are not in $T_A$. Otherwise, we can create a cycle in $T_A$ involving a link in S and links of F which are in $T_A$. Therefore, links in S may be paired up with at least $|S|$ links in $E_{\overline{A}O}$, and the condition in Hall's Theorem is satisfied.

We now show that algorithm 200 is a polynomial time 2-approximation algorithm, i.e., $p_{E_{AO}}^{A} + p_{E_{A\overline{O}}}^{A} + p_{E_{\overline{A}O}}^{LI} + p_{E_{\overline{A}\overline{O}}}^{L1} + W_{E_{AO}} + W_{E_{A\overline{O}}} \leq 2 p_E^{OPT}$.

From the immediately preceding proposition, we have $$p_{E_{A\overline{O}}}^{A} + W_{E_{A\overline{O}}} + p_{E_{A\overline{O}}}^{LI} \leq p_{E_{\overline{A}O}}^{OPT} + 2 p_{E_{\overline{A}O}}^{OPT}.$$

Also, $$p_{E_{AO}}^{A} + W_{E_{AO}} = u_{E_{AO}} \leq 2 p_{E_{AO}}^{OPT}$$

since OPT has to reserve at least ½ the capacity of each link in $E_{AO}$ for protection. Also, $$p_{E_{\overline{A}O}}^{LI} \leq p_{E_{\overline{A}O}}^{OPT}$$

because there is no solution in which the working capacity of a cross link $e_{\overline{A}O}$ can exceed $u_{e_{\overline{A}O}} - p_{e_{\overline{A}O}}^{L1}$.

We give a worse case example. Consider a ring of size n with unit capacity, the optimal solution is to put 0.5 units of protection on each link. This gives a total protection of $$\frac{n}{2}$$

units. Algorithm 200 would return a tree of size n−1 and put full protection to each link, which gives a total protection of n−1 units. Therefore, the approximation factor is close to 2.

IV. LP-based Approach

In this section, we present a natural relaxation to our problem which can be modeled as a linear program (LP). In this relaxation, on the failure of a link, its traffic can be arbitrarily split and rerouted over multiple detours. That is, in this relaxation, we require that the graph G−e must support at least $w_e$ flow between nodes u and v, for every link e=(u, v), using only the protection capacities on the remaining links. The LP is shown below.

For the LP, we transform the undirected graph into a directed graph by replacing each link into two directed links. We use the notation pair (e) to denote the link in the opposite direction of link e. We assume that both the directed links fail together. Note that in this relaxation on the failure of link e, at most $w_e$ traffic on it is rerouted over multiple detour paths $P_e$ using only the protection capacities on the links on the paths $P_e$. We use flow (e, i) to denote the amount of flow rerouted on link i on the failure of link e. The relaxed LP is:

Minimize $\Sigma_{e \in E}(p_e/2)$

Subject to the following constraints:

$$\sum_{i \in \delta_{in}(v)} \text{flow}(e, i) = \sum_{i \in \delta_{out}(v)} \text{flow}(e, i) \ \forall \ e \in E, v \in V \quad (10)$$

$$\text{flow}(e, \text{pair}(e)) = w_e \forall e \in E \quad (11)$$

$$\text{flow}(e, e) = 0 \forall e \in E \quad (12)$$

$$\text{flow}(e, i) \leq p_i \forall e, i \in E, e \neq \text{pair}(i) \quad (13)$$

$$w_e \geq W_e \, \forall e \in E \quad (14)$$

$$p_e + w_e = u_e \, \forall e \in E \quad (15)$$

$$w_e = w_{pair(e)} \, \forall e \in E \quad (16)$$

Note that since the protection capacity of each (undirected) edge is counted twice once for each direction, we divide the total protection capacity by 2 in the objective function. Constraint 10 takes care of the flow conservation at each node (including the end nodes of e). For link e=(u, v), a flow of $w_e$ from node u to node v is guaranteed by sending a flow of $w_e$ from v to u (constraint 11) and using the flow conservation equations at nodes u and v. Constraints 12 guarantees that this flow conservation is not achieved using the link (u, v). Constraint 13 guarantees that the flow does not exceed the protection capacity of any link. Constraint 14 guarantees that the working capacity of a link is at least the existing traffic. Constraint 15 guarantees that sum of protection and working capacity does not exceed the total capacity. Constraint 16 is for guaranteeing a solution for the undirected graph.

We show that the integrality gap of the LP or the ratio of the optimal integral solution to the optimal relaxed solution is unbounded. This may be proven as follows.

Consider a complete graph G of n nodes with edges of unit capacities. Let the existing traffic $W_e$ on each edge e be ½. Note that in any integral solution the protection capacity $p_e$=½ for any edge e. This is because $W_e$=½ and thus $p_e \leq$½. Also, on any path $P_e$ connecting the end-points of edge e, we have $p_{e'} \leq$½ for any edge e' on $P_e$. Therefore, we must have $w_e \leq$½ or $p_e \geq$½. Thus, the total protection capacity is $O(n^2)$ for any integral solution. The LP however can set $p_e$=½ for edges on a hamiltonian cycle of G and set $p_e$=0 for all other edges. Note that this is a feasible solution, since for any edge not in the hamiltonian cycle there are two paths connecting its endpoints (the two sides of the hamiltonian cycle) each with $p_{e'}$=½ for all edges e' on these paths. Thus, these paths can support a total flow of $w_e$=1 unit using only the protection capacity of their edges. For an edge e in the hamiltonian cycle, $w_e$=½ and the path obtained by removing e from the hamiltonian cycle can support a flow of ½ units using only the protection capacity of its edges. Thus, the LP has a feasible solution of total protection capacity O(n), implying the integrality gap.

V. NP-hardness

In this section, we show using a reduction from 3-SAT that the decision version of the problem to pre-provision existing networks to support fast restoration (PREPROVISION) is NP-hard.

Figure 3:
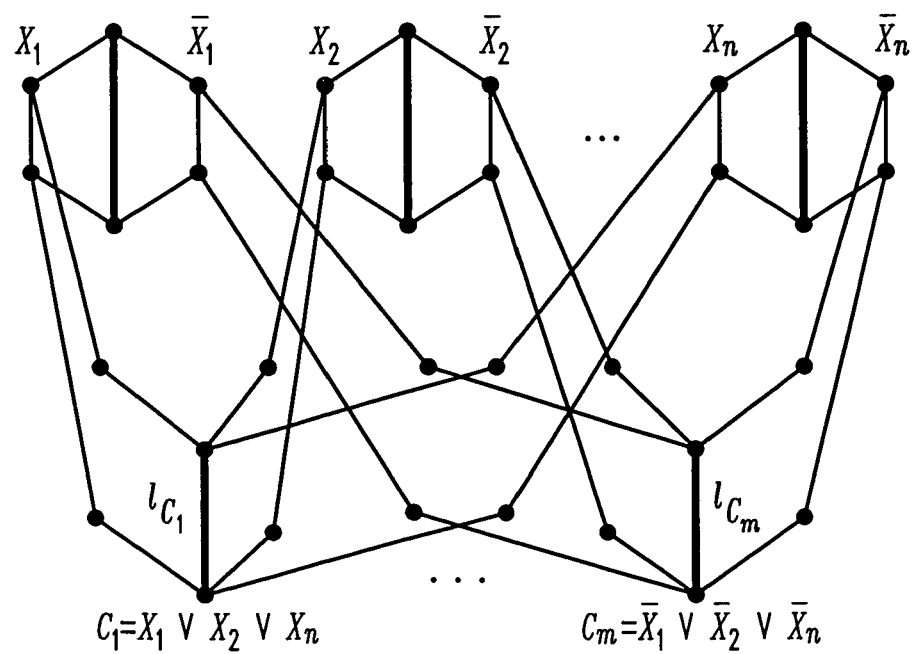
FIG. 3 is a diagram illustrating a graph for use in describing one or more embodiments of the present invention.

Let $\{X_1, X_2, \ldots, X_n\}$ be the set of variables and $\{C_1; C_2, \ldots, C_m\}$ be the set of clauses in a given instance C of 3-SAT. We construct an instance of PREPROVISION such that it has a feasible solution of total protection capacity at most 4.5 n+8 m if and only if C is satisfiable. As shown in FIG. 3, for each variable $X_i$, we create a cycle consisting of 6 unit-capacity links without any existing traffic. We have a unit-capacity link splitting the cycle into two equal halves. This link, with existing traffic of 1 unit, is represented by a thick segment in FIG. 3. Three of the links, on the left part of the cycle, correspond to literal $X_i$, and the other three links, on the right part of the cycle, correspond to literal $\overline{X}_i$. For each clause $C_j$, we create an octopus-like structure. We have a unit-capacity link $l_{C_j}$ with existing traffic of 1 unit (represented by a thick segment in FIG. 3). Three pairs of feet, where each pair corresponds to a literal in the clause, are attached to the two end-points of link $l_{C_j}$. Each foot consists of two serially-connected unit-capacity links without any existing traffic. If literal $X_i$ appears in clause $C_j$, one foot connects the upper end-point of link $l_{C_j}$ to the node between the first and second link of the half-cycle corresponding to $X_i$. The other foot of this pair of feet connects the lower end-point of link $l_{C_j}$ to the node between the second and third link of the half-cycle corresponding to $X_i$. Therefore, we have 6 n+8 m nodes and 7 n+13 m links in the network.

It is to be appreciated that, if the 3-SAT instance is satisfiable, then there exists a feasible solution to the PREPROVISION instance with total protection capacity of 4.5 n+8 m. This may be proven as follows.

If a literal $X_i$ ($\overline{X}_i$) is true in the satisfying assignment, we put protection of 1 unit on each of the three links in the half-cycle corresponding to $X_i$ ($\overline{X}_i$). Otherwise, we put protection of half units on each of these three links. Therefore, a total of 4.5 units of protection is reserved for each variable. In each clause, one of its literals must be true. We put protection of 1 unit on each of the four links between the clause and one of the true literals. We put protection of half units on each link in the remaining two pairs of feet (each pair of feet consists of 4 links). Therefore, a total of 8 units of protection is reserved for each clause. For links with an existing traffic of 1 unit (the thick segments), we have no choice but to put 0 units of protection. The total protection capacity reserved is therefore 4.5 n+8 m.

It is evident that, with this reservation, all links are protected by a detour path. The link which splits a cycle for a variable is protected by the 3-link half-cycle corresponding to the true literal for the variable. Since there is at least one true literal in each clause, the link $l_{C_j}$ in the middle of the gadget of a clause is protected too. The working traffic in the remaining links is either zero or half, and therefore they can be protected because all the remaining links have protection capacity of half units.

Further, it is to be appreciated that, if there exists a feasible solution to the PREPROVISION instance with total protection capacity of 4.5 n+8 m, then the 3-SAT instance is satisfiable.

From the above two propositions, the problem of pre-provisioning existing networks is NP-hard.

VI. Simulation Results

To measure the performance of the illustrative algorithm, we did extensive simulations using various networks, including some standard networks such as the ARPANET network (FIG. 4A), the NJ LATA network (FIG. 4B), the National network (FIG. 4C) and the European Cost239 network (FIG. 4D).

We ran our algorithm on these networks, both with uniform link capacities $u_e$=100 and with randomly chosen non-uniform link capacities $u_e$ in the range 100 to 200. We did two sets of simulations by randomly and independently choosing the amount of existing load ($W_e$) on each link e in the range 0% to 50% in one case and 0% to 60% in the other. We used, as a benchmark, the solution to a linear program (LP) that models our problem with the relaxation that on the failure of a link its traffic can be arbitrarily split and rerouted over multiple detours. That is, in this relaxation, we require that the graph G−e must support at least $w_e$ flow between nodes u and v, for every link e=(u, v), using only the protection capacities on the remaining links. Note that, since this linear program models a problem with fewer constraints, its optimal solution is a lower bound on the optimal solution to our problem.

Our main results are summarized in the tables of FIGS. 5A (50% Max Load) and 5B (60% Max Load). The tables report the total amount of protection capacity reserved by each algorithm, averaged over 10 instances. As an example, we describe these results, for the NJ LATA network. The network has 11 nodes and 23 links. Under uniform link capacity (100 units) and maximum load of 50%, our tree algorithm finds a solution of total protection capacity 1090. After trimming, the protection capacity is reduced to 1060. The LP returns a multi-path solution of total protection capacity 550. Note that all input instances are feasible with uniform link capacities and 50% maximum load. If the link capacities are not uniform, the LP is more likely to find a feasible solution, because it can protect a link using multiple detour paths.

Moreover, the denser the network, the higher is the likelihood of a feasible solution. When the existing traffic can be up to 60% of the link capacity, the success probability decreases, especially under non-uniform link capacities, while the success probability using the LP model does not decrease as much. This suggests that although using only one detour path for each link is simpler in implementation, using more than one detour path to protect a link may be a better way to share protection capacities.

VII. Illustrative Hardware Implementation

Figures 5, 6:
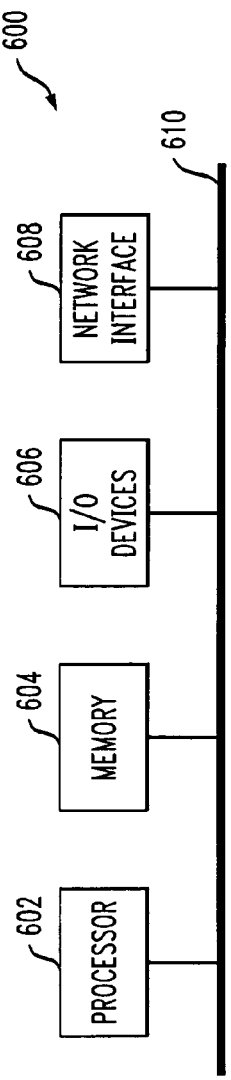
FIG. 6 is a diagram illustrating a computer system for implementing a network restoration design system according to an embodiment of the present invention.

Referring now to FIG. 6, a block diagram illustrates a generalized hardware architecture of a computer system suitable for implementing a design system for computing protection capacity, according to an embodiment of the present invention. More particularly, it is to be appreciated that design system 100 in FIG. 1 may implement such a computing system 600 to perform the algorithm (methodology) of the invention. Also, one or more system components (e.g., in a network being designed) may implement such a computing system 600. Of course, it is to be understood that the invention is not limited to any particular computing system implementation.

In this illustrative implementation, a processor 602 for implementing at least a portion of the algorithm (methodology) of the invention is operatively coupled to a memory 604, input/output (I/O) device(s) 606 and a network interface 608 via a bus 610, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit. It is to be appreciated that such input devices may be one mechanism for a user to provide the design inputs used by a design system of the invention to generate design results. Alternatively, the design inputs could be read into the design system from a diskette or from some other source (e.g., another computer system) connected to the computer bus 610. Also, inputs to the design methodology may be obtained in accordance with the one or more input devices. The output devices may be one mechanism for a user or other computer system to be presented with results of the design methodology.

Still further, the phrase "network interface" as used herein is intended to include, for example, one or more devices capable of allowing the computing system 600 to communicate with other computing systems. Thus, the network interface may comprise a transceiver configured to communicate with a transceiver of another computer system via a suitable communications protocol. It is to be understood that the invention is not limited to any particular communications protocol.

It is to be appreciated that while the present invention has been described herein in the context of design systems, the methodology of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital or analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the algorithm (methodology) of the invention, as described herein, may be stored in one or more of the associated storage media (e.g., ROM, fixed or removable storage) and, when ready to be utilized, loaded in whole or in part (e.g., into RAM) and executed by the processor 602.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Accordingly, as described herein, the present invention provides many features and advantages. By way of example, the invention provides techniques for substantially guaranteeing protection for both the existing and any future working traffic that may be routed utilizing the pre-provisioned working capacity of the link. The invention also provides techniques for determining the feasibility of protecting the existing working traffic in the network. Further, the invention substantially guarantees protection for the current and future working traffic against a fixed number of network link failures using only the pre-reserved protection capacity and the bypass tunnels.

It is to be appreciated that protection guarantees are provided independent of the amount or nature of working traffic carried by the network. Further, protection guarantees are provided independent of the routing for the working traffic carried by the network. Still further, the techniques of the invention can be implemented in existing networks without requiring significant routing extensions. Also, protection guarantees hold even if all the working traffic of a failed link has to be re-routed as a whole on a single bypass tunnel.

The invention also provides techniques in which the amount of network overbuild required is no more than two times the overbuild required for any optimal solution that provides the same protection guarantees. Overbuild generally refers to the amount of redundancy needed to support protection. Further, the invention provides techniques in which the amount of overbuild required is significantly less than what is required for providing the same protection guarantees using existing ring-based (e.g. SONET) schemes. Still further, the invention provides techniques that do not require the use of computationally expensive solvers of linear programs and, hence, can be efficiently implemented either in an off-line management server or in the network routers themselves.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method of designing a protection capacity to be reserved in a network, the method comprising the steps of:
obtaining link capacities associated with a network topology and existing working traffic in the network; and
determining capacity partitions for links in the network topology, each of at least a portion of the capacity partitions comprising a protection capacity portion and a working capacity portion that equals or exceeds the existing working traffic on a corresponding link, such that upon a failure on the link, the working traffic on the link is rerouted over a pre-provisioned detour path using the protection capacity portion on one or more links on the detour path, wherein the capacity partition determination step protects existing working traffic in the network, further wherein the capacity partition determining step further comprises: (i) determining a capacity partition in accordance with a spanning tree based methodology that computes a maximum spanning tree based on a maximum protection capacity of a link; (ii) setting the working capacity of a cross link to the minimum of the maximum protection capacity of the links, that are part of the maximum spanning tree, in a detour path associated with a given link to ensure that the one or more links, that are part of the maximum spanning tree, in the detour path have sufficient protection capacity to protect the given link upon failure; and (iii) boosting capacity in one or more cross links, that are not part of the maximum spanning tree, to ensure that one or more unprotected links, that are part of the maximum spanning tree, in the detour path associated with the given link are now protected.

2. The method of claim 1, wherein the capacity partition determining step further protects future working traffic in the network.

3. The method of claim 1, wherein the capacity partition determining step further comprises determining a feasibility of protecting the existing working traffic in the network.

4. The method of claim 1, wherein the capacity partition determining step further protects the existing working traffic and future working traffic against a fixed number of network link failures using only pre-provisioned protection capacity and detour paths.

5. The method of claim 1, wherein the capacity partition determining step further protects existing and future working traffic in the network independent of the amount or nature of working traffic carried by the network.

6. The method of claim 1, wherein the capacity partition determining step further protects existing and future working traffic in the network independent of routing for working traffic carried by the network.

7. The method of claim 1, wherein the network topology comprises an optical network topology.

8. The method of claim 1, wherein the network topology comprises a multi-protocol label switching network topology.

9. The method of claim 1, wherein the network topology comprises an asynchronous transfer mode network topology.

10. Apparatus for designing a protection capacity to be reserved in a network, the apparatus comprising:
a memory; and
at least one processor coupled to the memory and operative to: (i) obtain link capacities associated with a network topology and existing working traffic in the network; and (ii) determine capacity partitions for links in the network topology, each of at least a portion of the capacity partitions comprising a protection capacity portion and a working capacity portion that equals or exceeds the existing working traffic on a corresponding link, such that upon a failure on the link, the working traffic on the link is rerouted over a pre-provisioned detour path using the protection capacity portion on one or more links on the detour path, wherein the capacity partition determination operation protects existing working traffic in the network, further wherein the capacity partition determining operation further comprises: (a) determining a capacity partition in accordance with a spanning tree based methodology that computes a maximum spanning tree based on a maximum protection capacity of a link; (b) setting the working capacity of a cross link to the minimum of the maximum protection capacity of the links, that are part of the maximum spanning tree, in a detour path associated with a given link to ensure that the one or more links, that are part of the maximum spanning tree, in the detour path have sufficient protection capacity to protect the given link upon failure; and (c) boosting capacity in one or more cross links, that are not part of the maximum spanning tree, to ensure that one or more unprotected links, that are part of the maximum spanning tree, in the detour path associated with the given link are now protected.

11. The apparatus of claim 10, wherein the capacity partition determining operation further protects future working traffic in the network.

12. The apparatus of claim 10, wherein the capacity partition determining operation further comprises determining a feasibility of protecting the existing working traffic in the network.

13. The apparatus of claim 10, wherein the capacity partition determining operation further protects the existing working traffic and future working traffic against a fixed number of network link failures using only pre-provisioned protection capacity and detour paths.

14. The apparatus of claim 10, wherein the capacity partition determining operation further protects existing and future working traffic in the network independent of the amount or nature of working traffic carried by the network.

15. The apparatus of claim 10, wherein the capacity partition determining operation further protects existing and future working traffic in the network independent of routing for working traffic carried by the network.

16. The apparatus of claim 10, wherein the network topology comprises an optical network topology.

17. The apparatus of claim 10, wherein the network topology comprises a multi-protocol label switching network topology.

18. The apparatus of claim 10, wherein the network topology comprises an asynchronous transfer mode network topology.

19. An article of manufacture for designing a protection capacity to be reserved in a network, comprising a computer readable storage medium containing one or more programs which when executed implement the steps of:

obtaining link capacities associated with a network topology and existing working traffic in the network; and determining capacity partitions for links in the network topology, each of at least a portion of the capacity partitions comprising a protection capacity portion and a working capacity portion that equals or exceeds the existing working traffic on a corresponding link, such that upon a failure on the link, the working traffic on the link is rerouted over a pre-provisioned detour path using the protection capacity portion on one or more links on the detour path, wherein the capacity partition determination step protects existing working traffic in the network, further wherein the capacity partition determining step further comprises: (i) determining a capacity partition in accordance with a spanning tree based methodology that computes a maximum spanning tree based on a maximum protection capacity of a link; (ii) setting the working capacity of a cross link to the minimum of the maximum protection capacity of the links, that are part of the maximum spanning tree, in a detour path associated with a given link to ensure that the one or more links, that are part of the maximum spanning tree, in the detour path have sufficient protection capacity to protect the given link upon failure; and (iii) boosting capacity in one or more cross links, that are not part of the maximum spanning tree, to ensure that one or more unprotected links, that are part of the maximum spanning tree, in the detour path associated with the given link are now protected.

* * * * *